(12) United States Patent
Nguyen et al.

(10) Patent No.: US 10,928,874 B2
(45) Date of Patent: Feb. 23, 2021

(54) BYPASS SWITCH CONTROL

(71) Applicant: HEWLETT PACKARD ENTERPRISE DEVELOPMENT LP, Houston, TX (US)

(72) Inventors: Hai Ngoc Nguyen, Houston, TX (US); Abhishek Banerjee, Houston, TX (US); Darrel G. Gaston, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 182 days.

(21) Appl. No.: 15/770,269

(22) PCT Filed: Oct. 29, 2015

(86) PCT No.: PCT/US2015/058057
§ 371 (c)(1),
(2) Date: Apr. 23, 2018

(65) Prior Publication Data
US 2018/0253132 A1     Sep. 6, 2018

(51) Int. Cl.
*G06F 1/26* (2006.01)
*G06F 1/30* (2006.01)
*H02J 9/06* (2006.01)

(52) U.S. Cl.
CPC .............. *G06F 1/263* (2013.01); *G06F 1/30* (2013.01); *H02J 9/06* (2013.01)

(58) Field of Classification Search
USPC ....................................................... 307/23
See application file for complete search history.

(56) References Cited

U.S. PATENT DOCUMENTS

| 7,598,628 | B2 | 10/2009 | Zver et al. |
| 8,212,401 | B2 | 7/2012 | Linkhart et al. |
| 8,853,887 | B2 | 10/2014 | Silberbauer et al. |
| 2001/0011845 | A1* | 8/2001 | Simonelli ............ H05K 7/1492 307/66 |
| 2007/0230094 | A1 | 10/2007 | Carlson |
| 2012/0068541 | A1 | 3/2012 | Anderson |

(Continued)

FOREIGN PATENT DOCUMENTS

| EP | 2378626 A1 | 10/2011 |
| IN | 01107DEL2009 A | 12/2010 |

(Continued)

OTHER PUBLICATIONS

Faisal H. Khan and Leon M. Tolbert, "Multiple-Load-Source Integration in a Multilevel Modular Capacitor-Clamped DC-DC Converter Featuring Fault Tolerant Capability," IEEE Transactions on Power Electronics, Jan. 2009, pp. 14-24, vol. 24, No. 1, IEEE.

(Continued)

*Primary Examiner* — Rexford N Barnie
*Assistant Examiner* — Xuan Ly
(74) *Attorney, Agent, or Firm* — Brooks, Cameron & Huebsch, PLLC

(57) ABSTRACT

In one example, a system for bypass switch control includes a controller coupled to a number of backup power modules and to a number of bypass switches that correspond to each of the number of backup power modules, wherein the controller activates a bypass switch when a corresponding backup power module is deactivated.

19 Claims, 2 Drawing Sheets

(56) References Cited

U.S. PATENT DOCUMENTS

| | | | |
|---|---|---|---|
| 2013/0193761 A1* | 8/2013 | Colombi | H02J 9/062 307/64 |
| 2013/0253716 A1 | 9/2013 | Gross et al. | |
| 2014/0029168 A1* | 1/2014 | Andersen | H02J 9/04 361/624 |
| 2015/0180275 A1* | 6/2015 | Tomassi | H02J 9/06 307/64 |
| 2017/0033595 A1* | 2/2017 | Mandarino | H02J 9/062 |

FOREIGN PATENT DOCUMENTS

| | | |
|---|---|---|
| IN | 302680 | 10/2018 |
| JP | 2006254659 A | 9/2006 |

OTHER PUBLICATIONS

International Search Report and Written Opinion, International Application No. PCT/US2015/058057, dated Jul. 29, 2016, pp. 1-11, KIPO.

* cited by examiner

BYPASS SWITCH CONTROL

BACKGROUND

Computing systems can utilize devices such as an uninterruptible power system (UPS). The UPS can help provide backup power to the computing system when main power fails. The computing system can lose power when the UPS fails or is deactivated. It can be important to provide continuous power to the computing device even when the UPS fails or becomes non-functional.

DETAILED DESCRIPTION

A number of methods, systems, and computer readable medium for bypass switch control are described herein. In one example, a system for bypass switch control includes a controller coupled to a number of backup power modules and to a number of bypass switches that correspond to each of the number of backup power modules, wherein the controller activates a bypass switch when a corresponding backup power module is deactivated. As used herein, a bypass switch includes a switch that is coupled between an input of an enclosure and an output of the enclosure that bypasses a particular backup power module. In some examples, the bypass switch can include back to back semiconductors. In some examples, each of the back to back semiconductors can be reverse polarity semiconductors. In certain examples, each of the back to back semiconductors can act as an individual switch that can be activated or deactivated by the controller.

The bypass switch control systems described herein can include a controller that is coupled to each of a plurality of bypass switches that correspond to a plurality of backup power modules. In some examples, the controller can be utilized to determine when a backup power module fails (e.g., malfunctions, not performing to specifications, etc.) or becomes deactivated (e.g., removed from an enclosure, turned off, etc.). In some examples, the controller can activate a bypass switch corresponding to a particular backup power module when the particular backup power module fails or becomes deactivated so that a load coupled to the particular backup power module can continue to receive power from a main power source.

In some examples, the controller can be coupled to a module release latch that can be utilized to remove a corresponding backup power module. In some examples, the backup power modules can be hot-pluggable backup power modules. As used herein, hot-pluggable includes an ability to couple and uncouple a backup power module from an already energized bus (e.g., direct current (DC) bus, etc.). In some examples, a module release latch can be utilized to uncouple (e.g., remove) and/or couple a corresponding backup power module while power is provided to a corresponding load. In these examples, it can be important for a controller to activate a corresponding bypass switch to provide continuous or near continuous power to the corresponding load so that an unexpected shutdown of the load does not occur.

Figure 1:
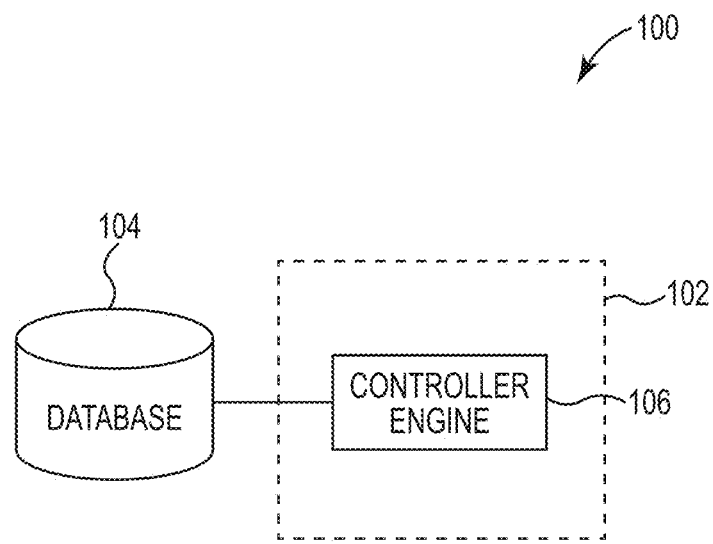
FIG. 1 illustrates a diagram of an example of a system for bypass switch control consistent with the present disclosure.
Figure 2:
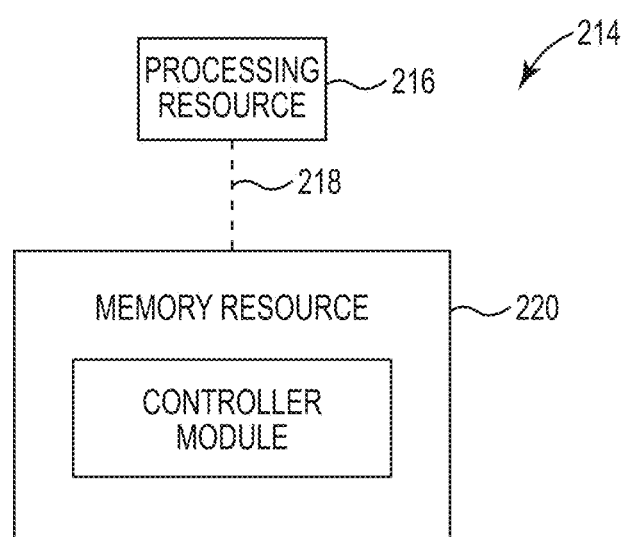
FIG. 2 illustrates a diagram of an example computing device for bypass switch control consistent with the present disclosure.

FIGS. 1 and 2 illustrate examples of system 100 and computing device 214 consistent with the present disclosure. FIG. 1 illustrates a diagram of an example of a system 100 for bypass switch control consistent with the present disclosure. The system 100 can include a database 104, a bypass switch control system 102, and/or a number of engines (e.g., controller engine 106). The bypass switch control system 102 can be in communication with the database 104 via a communication link, and can include the number of engines (e.g., controller engine 106). The bypass switch control system 102 can include additional or fewer engines that are illustrated to perform the various functions as will be described in further detail in connection with FIG. 3.

The number of engines (e.g., controller engine 106) can include a combination of hardware and programming, but at least hardware, that is configured to perform functions described herein (e.g., activate a bypass switch when a corresponding backup power module is deactivated, activate the bypass switch when a module latch is pressed to remove the corresponding backup power module, activate a portion of the number of bypass switches to bypass power received at the input of the enclosure from a corresponding backup power module directly to the output of the enclosure, activate the portion of the number of bypass switches when the portion of the number of bypass switches are deactivated, etc.). The programming can include program instructions (e.g., software, firmware, etc.) stored in a memory resource (e.g., computer readable medium, machine readable medium, etc.) as well as hard-wired program (e.g., logic).

The controller engine 106 can include hardware and/or a combination of hardware and programming, but at least hardware, to activate a bypass switch when a corresponding backup power module is deactivated. As used herein, a bypass switch that corresponds to a backup power module includes a bypass switch that is coupled between an input of an enclosure and an input of the backup power module as well as between an output of the backup power module and an output of the enclosure. Thus, the bypass switch can be coupled such that when the bypass switch is activated power that is received from the input of the enclosure bypasses the backup power module.

The controller engine 106 can be coupled to each of a plurality of bypass switches. In some examples, the controller engine 106 can be coupled to each of a plurality of module release latches that can be utilized to remove a corresponding backup power module. In some examples, the controller engine can activate a bypass switch upon determining that a module release latch is pressed to remove the corresponding backup power module from an enclosure. In some examples, the controller engine 106 can activate the bypass switch within a threshold quantity of time so that near continuous power is received by a load coupled to the output of the enclosure.

FIG. 2 illustrates a diagram of an example computing device 214 consistent with the present disclosure. The computing device 214 can utilize software, hardware, firmware, and/or logic to perform functions described herein.

The computing device 214 can be any combination of hardware and program instructions configured to share information. The hardware, for example, can include a processing resource 216 and/or a memory resource 220 (e.g., computer-readable medium (CRM), machine readable medium (MRM), database, etc.). A processing resource 216, as used herein, can include any number of processors capable of executing instructions stored by a memory resource 220. Processing resource 216 may be implemented in a single device or distributed across multiple devices. The program instructions (e.g., computer readable instructions (CRI)) can include instructions stored on the memory resource 220 and executable by the processing resource 216 to implement a desired function (e.g., activate a bypass switch when a corresponding backup power module is deactivated, activate the bypass switch when a module latch is pressed to remove the corresponding backup power module, activate a portion of the number of bypass switches to bypass power received at the input of the enclosure from a corresponding backup power module directly to the output of the enclosure, activate the portion of the number of bypass switches when the portion of the number of bypass switches are deactivated, etc.).

The memory resource 220 can be in communication with a processing resource 216. A memory resource 220, as used herein, can include any number of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, and/or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A number of modules (e.g., controller module 222) can include CRI that when executed by the processing resource 216 can perform functions. The number of modules (e.g., controller module 222) can be sub-modules of other modules. For example, the controller module 222 and an additional module can be sub-modules and/or contained within the same computing device. In another example, the number of modules (e.g., controller module 222) can comprise individual modules at separate and distinct locations (e.g., CRM, etc.).

Each of the number of modules (e.g., controller module 222) can include instructions that when executed by the processing resource 216 can function as a corresponding engine as described herein. For example, the controller module 222 can include instructions that when executed by the processing resource 216 can function as the soft-start controller engine 106.

Figure 3:
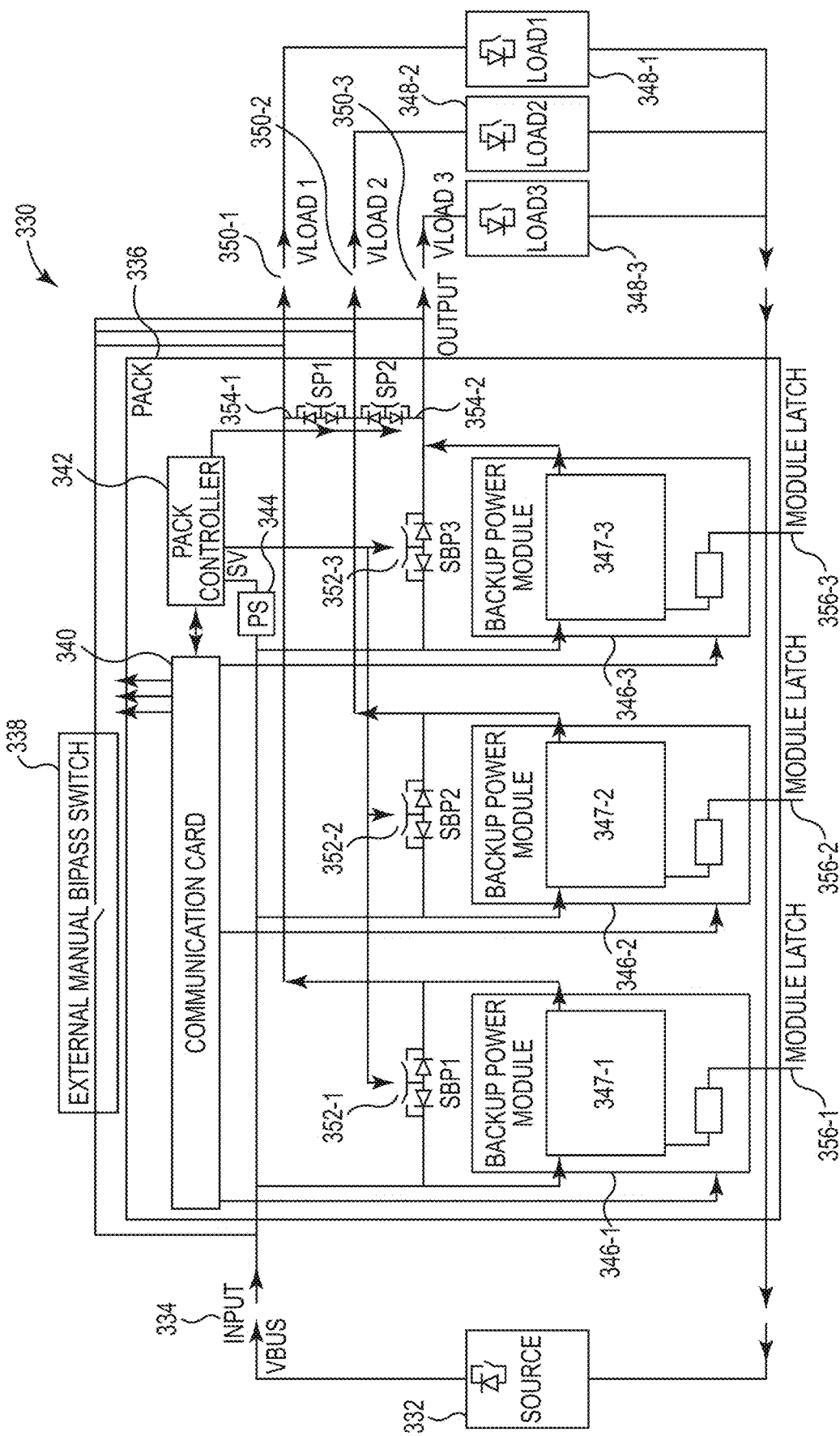
FIG. 3 illustrates an example system for bypass switch control consistent with the present disclosure.

FIG. 3 illustrates an example system 330 for bypass switch control consistent with the present disclosure. The system 330 can be utilized to provide power from a main power source 332 during normal operation (e.g., when a main power source is activated, when a main power source is functioning to manufacturer specifications, etc.) and provide backup power from a number of backup power modules 346-1, 346-2, 346-3 during a backup operation to a number of loads 348-1, 348-2, 348-3.

In some examples, the system 330 can include a distributed energy system (DES) pack enclosure 336 that encases the number of backup power modules 346-1, 346-2, 346-3, a power supply 344, a pack controller 342, and/or a communication card 340. In some examples, the DES pack enclosure 336 can include an input 334 that is coupled to a main power source 332 and a number of outputs 350-1, 350-2, 350-3 that are each coupled to a corresponding number of loads 348-1, 348-2, 348-3. In some examples, the system 330 can include an external manual bypass switch 338 for bypassing the DES pack enclosure 336 for maintenance or replacement.

In some examples, the power supply 344 can be utilized to direct power received from the main power source 332 to the pack controller 342 and/or a communication card 340. In some examples, the communication card 340 can be utilized to communicate information to a host. In some examples, the pack controller 342 can perform the functions of the controller engine 106 as referenced in FIG. 1 and/or the controller module 222 as referenced in FIG. 2.

In some examples, the number of backup power modules 346-1, 346-2, 346-3 can be coupled in parallel to individually provide power a corresponding load from the number of loads 348-1, 348-2, 348-3. For examples, backup power module 346-1 can individually provide power to load 348-1 during normal operation as well as during backup operations. Thus, in some examples, each of the number of backup power modules 346-1, 346-2, 346-3 can have backup power sources 347-1, 347-2, 347-3 (e.g., batteries, etc.) that can provide power to each of the corresponding number of loads 348-1, 348-2, 348-3. In some examples, the backup power sources 347-1, 347-2, 347-3 can include a plurality of batteries coupled in series to provide high voltage direct current (HVDC) to a number of loads 348-1, 348-2, 348-3 during a backup operation. In some examples, the main power source 332 can supply alternating current (AC) power to the number of loads 348-1, 348-2, 348-3 via the backup power sources 347-1, 347-2, 347-3 during normal operations. Thus, the number of loads 348-1, 348-2, 348-3 can be provided with AC power during normal operation and provided with HVDC during backup operations In some examples, the backup power modules 346-1, 346-2, 346-3 can be hot-pluggable backup power modules. As used herein, a hot-pluggable backup power module can include a backup power module that is capable of being coupled and decoupled from an already energized DC bus. For example, each of the backup power modules 346-1, 346-2, 346-3 can be coupled to a corresponding module latch 356-1, 356-2, 356-3. The module latch 356-1, 356-2, 356-3 can be operated by a user to remove a corresponding backup power module 346-1, 346-2, 346-3 even when coupled to an already energized DC bus. For example, backup power module 346-1 can be removed from an already energized DC bus by pressing the module latch 356-1 to a lower position and the backup power module 346-1 can be removed from the DES pack enclosure 336.

In some examples, each of the backup power modules 346-1, 346-2, 346-3 can include a corresponding bypass switch 352-1, 352-2, 352-3. The number of bypass switches 352-1, 352-2, 352-3 can be utilized to bypass a corresponding backup power module 346-1, 346-2, 346-3 when a backup power module is removed or is non-functional. In some examples, when one of the backup power modules 346-1, 346-2, 346-3 are removed or is non-functional, the corresponding bypass switch 352-1, 352-2, 352-3 can be utilized to bypass the backup power module and continue to provide power, without a backup power module, to a corresponding load of the number of loads 346-1, 346-2, 346-3.

In some examples, the pack controller 342 can be coupled to each of the bypass switches 352-1, 352-2, 352-3. For example, the pack controller 342 can be coupled to each of the bypass switches 352-1, 352-2, 352-3 to activate and deactivate each of the bypass switches 352-1, 352-2, 352-3, as described herein. In some examples, the pack controller 342 can activate a corresponding bypass switch of a backup power module that has failed or become deactivated. For example, the controller 342 can determine that backup power module 346-1 has failed. In this example, the pack controller 342 can activate bypass switch 352-1 when the pack controller 342 determines that backup power module 346-1 has failed. In another example, the pack controller 342 can activate bypass switch 352-1 when the pack controller 342 determines that backup power module 346-1 is being uncoupled via module latch 356-1.

In some examples, the bypass switches 352-1, 352-2, 352-3 can each comprise back to back semiconductors that can each by activated or deactivated by the pack controller 342. In some examples, the back to back semiconductors can include back to back reverse polarity semiconductors that can be utilized to protect an integrity of the DES pack enclosure 336. In some examples, the pack controller 342 can activate both of the back to back semiconductors of bypass switch 352-1 to allow power received from the input 334 to bypass backup power module 346-1 and be received by the load 348-1.

In some examples, one of the back to back reverse polarity semiconductors can be activated during normal operation and one of the back to back reverse polarity semiconductors can be deactivated during normal operation so that power is received at an input of a corresponding backup power module. For example, bypass switch 352-1 can have two back to back reverse polarity semiconductors. In this example, a first reverse polarity semiconductor can be coupled to an input of the backup power module 346-1 and a second reverse polarity semiconductor can be coupled to an output of the backup power module 346-1. In this example, the second reverse polarity semiconductor can be activated during normal operation where power received at the input 334 is provided to an input of the backup power module 346-1. In this example, the first reverse polarity semiconductor can be activated by the pack controller 342 to bypass power from the backup power module 346-1.

In some examples, system 330 can include a number of switches 354-1, 354-2 that can be coupled to the pack controller 342. In some examples, the pack controller 342 can activate and/or deactivate the number of switches 354-1, 354-2 to combine resources of the number backup power modules 346-1, 346-2, 346-3. For example, the pack controller 342 can determine power requirements of the number of loads 348-1, 348-2, 348-3 and activate and/or deactivate the number of switches 354-1, 354-2 based on the power requirements of the number of loads 348-1, 348-2, 348-3. In a specific example, the controller 342 can activate one of the bypass switches 352-1, 352-2, 352-3 when one of the number of backup power modules 346-1, 346-2, 346-3 is removed from the DES pack enclosure 336. In this example, the backup power requirements of the load corresponding to the backup power module that was removed from the DES pack enclosure 336 can be provided additional resources when the controller 342 activates one of the switches 354-1, 354-2 to combine resources of the number backup power modules 346-1, 346-2, 346-3.

The system 330 can provide continuous or near continuous power to the number of loads 348-1, 348-2, 348-3 even when a number of backup power modules 346-1, 346-2, 346-3 fail or become deactivated (e.g., removed from a DES pack enclosure 336, etc.). As described herein, each of the number of backup power modules 346-1, 346-2, 346-3 can have a corresponding bypass switch 352-1, 352-2, 352-3 that can be coupled to a pack controller 342. As described herein, the pack controller 342 can be utilized to determine when a backup power module 346-1, 346-2, 346-3 fails or is going to be removed from the DES pack enclosure 336 so that the corresponding bypass switch 352-1, 352-2, 352-3 can be activated within a particular quantity of time to provide continuous or near continuous power to a corresponding load 348-1, 348-2, 348-3.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A system for bypass switch control, comprising:
multiple backup power modules;
multiple bypass switches, each one of the multiple bypass switches corresponding to a corresponding backup power module of the multiple backup power modules;
a controller coupled to the multiple backup power modules and to the multiple bypass switches, wherein the controller activates an activated bypass switch of the multiple bypass switches in response to a deactivation of a selected backup power module of the multiple backup power modules to which the activated bypass switch corresponds, leaving a remainder of the multiple backup power modules active.

2. The system of claim 1, wherein the multiple backup power modules are coupled together in parallel to the controller.

3. The system of claim 1, wherein:
each one of the multiple backup power modules comprises an input and an output; and
each one of the bypass switches is coupled between the input and the output of the corresponding backup power module.

4. The system of claim 1, further comprising a module latch corresponding to the selected backup power module, wherein the controller activates the bypass switch in response to the module latch being pressed to remove the selected backup power module.

5. The system of claim 1, wherein the controller activates the activated bypass switch in response to a failure of the selected backup power module.

6. The system of claim 1, wherein each one of the multiple backup power modules is coupled to a corresponding load.

7. The system of claim 1, wherein the multiple backup power modules and the multiple bypass switches are enclosed within a distributed energy system (DES) pack.

8. A system for bypass switch control, comprising:
multiple backup power modules coupled in parallel between an input and an output of an enclosure, each one of the multiple backup power modules comprising a module input and a module output;
multiple bypass switches, each one of the multiple bypass switches being coupled to a corresponding backup power module of the multiple backup power modules, wherein each one of the multiple bypass switches is coupled to the module input and the module output of the corresponding backup power module; and
a controller coupled to each one of the multiple bypass switches, wherein the controller is to activate a portion of the multiple bypass switches to bypass power received at the input of the enclosure directly to the output of the enclosure, thereby bypassing a corresponding portion of the multiple backup power modules, to which the portion of the multiple bypass switches are coupled.

9. The system of claim 8, wherein the controller is to activate the portion of the multiple bypass switches in response to a deactivation of the corresponding portion of the multiple backup power modules.

10. The system of claim 8, wherein each one of the multiple backup power modules is coupled to a different load that is coupled to the output of the enclosure.

11. A distributed energy system, comprising:
an enclosure that comprises:
a plurality of hot-pluggable backup power modules that each include a corresponding module latch and that each have a power module input and a power module output;
an enclosure input coupled in parallel to the plurality of hot-pluggable backup power modules;
a plurality of bypass switches coupled between the power module input and the power module output of a corresponding one of the plurality of hot-pluggable backup power modules;
a controller coupled to each of the plurality of bypass switches and to each of the corresponding module latches to activate a corresponding one of the plurality of bypass switches in response to the corresponding module latch being pressed.

12. The distributed energy system of claim 11, wherein the corresponding module latch is pressed to decouple the corresponding hot-pluggable backup power module from the enclosure input and an output of the enclosure.

13. The distributed energy system of claim 11, wherein the controller activates the corresponding one of the plurality of bypass switches within a 1 second time period of the corresponding module latch being pressed.

14. The distributed energy system of claim 11, wherein the corresponding module latch deactivates a corresponding one of the plurality of hot-pluggable backup power modules to decouple the corresponding one of the plurality of hot-pluggable backup power modules from an energized direct current (DC) bus.

15. The system of claim 8, wherein the multiple backup power modules are coupled in parallel to the controller.

16. The system of claim 8, wherein:
each one of the multiple backup power modules comprises a module latch; and
in response to the module latch of a selected one of the multiple backup power modules being pressed, the controller activates the bypass switch that is coupled to the selected backup power module.

17. The system of claim 8, wherein the controller is to activate the portion of the multiple bypass switches in response to a failure of the corresponding portion of the multiple backup power modules.

18. The distributed energy system of claim 11, wherein the plurality of hot-pluggable backup power modules are coupled in parallel to the controller.

19. The distributed energy system of claim 11, wherein the controller is to activate a corresponding one of the plurality of bypass switches in response to a failure of the corresponding one of the plurality of hot-pluggable backup power modules.

* * * * *